Figure 1:
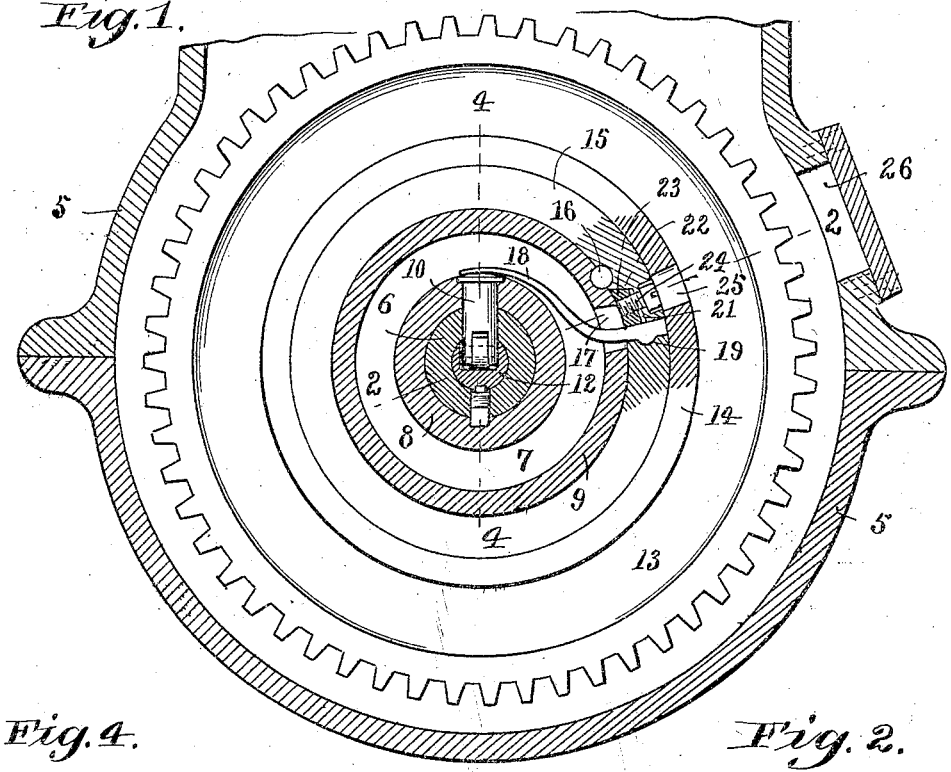

No. 890,210. PATENTED JUNE 9, 1908.
E. P. BULLARD, Jr.
FRICTION CLUTCH.
APPLICATION FILED JUNE 1, 1907.

Witnesses
Inventor
Edward P. Bullard Jr.
By Chamberlain & Newman
Attorneys

UNITED STATES PATENT OFFICE.

EDWARD P. BULLARD, JR., OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

FRICTION-CLUTCH.

No. 890,210.

Specification of Letters Patent.   Patented June 9, 1908.

Application filed June 1, 1907.   Serial No. 376,839.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Friction-Clutches, of which the following is a specification.

My invention relates to friction clutches and especially to means for adjusting its friction and improving the construction.

It is the purpose of this invention to improve upon well known types of friction clutches by providing means whereby the clamping member of the same may be adjusted with relation to its operating lever, so as to better provide against lost motion as from wear; to provide an adjustment that will permit of the said clutch being timed to act, or take hold, at any particular point of movement in its operating means, and to generally improve the construction to insure a quicker and more perfect acting device.

My improvements are especially applicable to such a type of clutch as that shown in patent to Rivett #462,738 of November 10th, 1891 and in connection with which I have used my improvements successfully, upon boring mills, lathes, etc. This type of clutch is obviously adapted for use singly or in series as for instance in various forms of changeable speed gear devices, not shown in the drawings.

Upon the accompanying drawings forming a part of this specification, similar characters of reference denote like or corresponding parts throughout the several figures and of which:—

Figure 4:
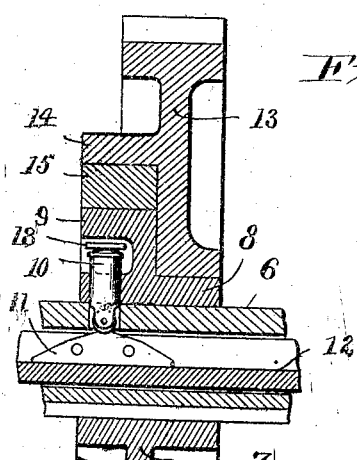
Figure 3:
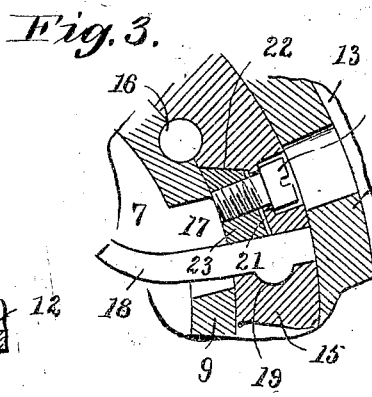
Figure 2:
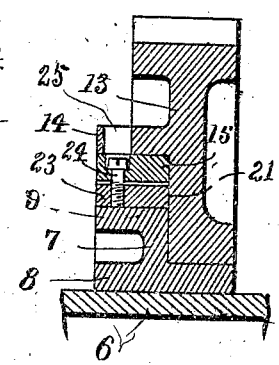

Figure 1, shows a cross sectional elevation of a Rivett type of clutch applied to a gear wheel and illustrating my improvements applied thereto. Fig. 2, shows a detail cross section taken on the line 2—2 of Fig. 1. Fig. 3, is an enlarged detail sectional elevation, of the adjusting mechanism for the clutch, as shown in Fig. 1. Fig. 4, is a further detail cross section, of the clutch shown in Fig. 4, and taken on line 4—4 of Fig. 1, with the parts in different positions.

In the accompanying drawing I have shown my improvements in connection with a clutch designed somewhat after the construction of the said Rivett patent, but applied to a gear, and inclosed within a speed box, but it obviously can be employed in any other connections with equally as beneficial results and therefore I do not limit myself in its application and use.

Referring in detail to the characters of reference marked upon the drawings 5 represents a suitable casing inclosing the clutch, and 6 a shaft which may be journaled in the ends of the casing. Upon this shaft is mounted a spider 7 comprising in part a hub 8 and a peripheral flange 9 which may constitute the driven member. Within the hub 8 of the spider is slidably mounted a radial pin 10 bearing a roll upon its inner end to engage the cam 11 by means of which it is operated. This cam is secured within a longitudinal groove of the operating rod 12 which is slidably mounted in the hollow shaft 6 before mentioned.

The driving wheel 13 is mounted to rotate upon the extended hub portion of the spider and contains an annular flange 14 which is located on the same side as the flange 9 of the spider. Intermediate of these two flanges 9 and 14, one of which is upon the spider and the other upon the wheel is fitted a split friction ring 15, which is secured at one end to the inner flange by means of a pin 16, to secure one end to the spider, yet leave the entire remaining portion free to act upon the flanges, which I find to be far more effective than if the pin were located at any intermediate point. The inner flange 9 is cut away as at 17 to accommodate the spring lever 18, the inner end of which is seated intermediate the ends of the friction ring 15 while the other end is engaged by the pin 10 before mentioned. The inner end portion of the said lever is provided with a transverse rib 19 on one side that fits into a corresponding recess in the end of ring to retain the said lever in place.

The inner corner of the fixed end of the ring is cut away to form a pocket 21 having an inclined end 22 within this pocket is fitted a hardened steel shoe 23, one end of which is beveled to engage the before mentioned inclined shoulder 22 of the pocket while the other is straight and engaged by the back of the lever. The shoe is obviously of a width equal to that of the ring, and is tapped to receive an adjusting screw 24 the body and head portion of which is seated in a suitable recess in the reduced end of the ring. The flange 14 is provided with a hole 25 through which access may be had to the screw for adjusting the same and shoe as by means of a screw driver. When the friction is employed within a casing as shown the latter would also be provided with an opening 26 through which the screw driver may be inserted for adjusting the screw. From the foregoing it will be clearly apparent that if the said screw 24 is turned in one direction the wedge like shoe is drawn outward in a manner to force the ends of the rings away from each other, and especially away from the lever, thus tending to expand and tighten it within the flanges while if turned in the opposite direction the ring is loosened. The shoe serves to form an engaging portion for the one end of ring with the near side of lever, while the other end of ring operatively engages the other side of lever.

When the slide rod 12 is moved forward to position shown in Fig. 4, the pin will be forced out and in turn acts upon the spring lever in a manner to cause its other end to be thrown at an angle with respect to the end of ring in a way to spread the same to engage the flanges. It will further be obvious that the looser the shoe the greater the movement of lever required to effect a clutching operation, while the tighter it is the less the movement need be.

Having thus described my invention what I claim and desire to secure by Letters Patent is:—

1. In a friction clutch of the class described, the combination with a driving and driven member, of a split ring fitted between said members and having a beveled end, a shoe fitted against said bevel end, a screw seated in the ring for adjusting said shoe with relation to the end of ring, a lever fitted intermediate of and engaging the shoe and adjacent end of ring, and a pin and slide rod to operate the lever.

2. In a friction clutch of the class described, the combination with a driving and driven member, of a split ring fitted between said members and having a beveled end, a shoe fitted against said bevel end, a screw seated in the ring for adjusting said shoe with relation to the end of ring, a lever fitted intermediate of and engaging the shoe and adjacent end of ring, a pin and slide rod to operate the lever, and a casing to inclose the clutch having a hole through which the screw may be adjusted.

3. In a friction clutch of the class described, the combination with a driving and driven member, of a split ring fitted between said members and having a pocket upon inside of one end with a beveled side wall, a shoe fitted in the said pocket and having a beveled end to engage the bevel side of pocket, a screw passing through the ring and shoe for adjusting the latter with relation to the ring, a lever fitted intermediate of shoe and adjacent end of ring, and a pin and slide rod to operate the lever.

4. In a friction clutch of the class described, the combination with a driving and driven member, of a split ring fitted between said members and having a transverse groove in one end, a lever fitted intermediate of ends of said ring and having a rib upon one side to engage said groove, to retain the lever in position between the ends of ring, a pin to engage the said lever and means to operate the pin.

Signed at Bridgeport, in the county of Fairfield, and State of Connecticut.

EDWARD P. BULLARD, Jr.

Witnesses:
  A. H. BULLARD,
  D. B. YOUNG.